US010162788B2

(12) United States Patent
Shetty et al.

(10) Patent No.: US 10,162,788 B2
(45) Date of Patent: Dec. 25, 2018

(54) USB ON THE GO (OTG) MULTI-HUB ENDPOINT REFLECTOR HUB

(71) Applicant: Microchip Technology Incorporated, Chandler, AZ (US)

(72) Inventors: Santosh Shetty, Cedar Park, TX (US); Swaroop Adusumilli, Chandler, AZ (US); Pragash Mangalapandian, Chennai (IN); Lakshmi Narasimhan, Chennai (IN); Mark R. Bohm, Village of Bear Creek, TX (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 168 days.

(21) Appl. No.: 15/241,756

(22) Filed: Aug. 19, 2016

(65) Prior Publication Data

US 2018/0052799 A1 Feb. 22, 2018

(51) Int. Cl.
*G06F 13/42* (2006.01)
*G06F 13/40* (2006.01)
*G06F 13/00* (2006.01)

(52) U.S. Cl.
CPC ...... *G06F 13/4282* (2013.01); *G06F 13/4022* (2013.01); *G06F 13/00* (2013.01); *G06F 2213/4004* (2013.01)

(58) Field of Classification Search
CPC ............ G06F 13/4282; G06F 13/4022; G06F 13/2213

(Continued)

(56) References Cited

U.S. PATENT DOCUMENTS 5,675,813 A 10/1997 Holmdahl ..................... 713/310
5,784,581 A 7/1998 Hannah ......................... 710/110

(Continued)

FOREIGN PATENT DOCUMENTS

GB 2352540 A 1/2001 ............. G06F 13/40
JP 2003256351 U 9/2003 ............. G06F 13/14

(Continued)

OTHER PUBLICATIONS

Anonymous, "Universal Serial Bus Specification rv. 2.0," 650 pages, Apr. 27, 2000.

(Continued)

*Primary Examiner* — Tammara R Peyton
(74) *Attorney, Agent, or Firm* — Slayden Grubert Beard PLLC

(57) ABSTRACT

A multi-host endpoint reflector enables a method of communication between multiple USB hosts through the USB devices connected to them, where data from one USB host is routed across the USB devices between endpoints of complimentary directions to one or more additional USB hosts. The multi-host endpoint reflector may be integrated with a USB hub controller to form a USB compound device to create a multi-host endpoint reflector hub. A USB multi-host endpoint reflector hub enables a USB OTG B device to become a host upon request by providing a data bridge between the OTG B device after it has transitioned to a host role while any other OTG A device that already is a host is not required to change its host role to a slave role. Therefore a plurality of OTG host devices may co-exist on the same interconnection system hub and communicate there between.

29 Claims, 4 Drawing Sheets

(58) Field of Classification Search
USPC .......................................................... 710/313
See application file for complete search history.

(56) References Cited

U.S. PATENT DOCUMENTS

| | | | | |
|---|---|---|---|---|
| 5,845,329 | A | 12/1998 | Onishi et al. | 711/157 |
| 6,119,190 | A | 9/2000 | Garney | 710/310 |
| 6,147,682 | A | 11/2000 | Kim | 345/211 |
| 6,205,501 | B1 | 3/2001 | Brief et al. | 710/100 |
| 6,308,239 | B1 | 10/2001 | Osakada et al. | 710/316 |
| 6,408,351 | B1 | 6/2002 | Hamdi et al. | 710/63 |
| 6,408,367 | B2 | 6/2002 | Achilles et al. | 711/157 |
| 6,516,205 | B1 | 2/2003 | Oguma | 455/557 |
| 6,532,512 | B1 | 3/2003 | Torii et al. | 710/316 |
| 6,549,966 | B1 | 4/2003 | Dickens | 710/300 |
| 6,601,109 | B1 | 7/2003 | Bealkowski et al. | 709/250 |
| 6,704,824 | B1 | 3/2004 | Goodman | 710/300 |
| 6,725,302 | B1 | 4/2004 | Benayoun et al. | 710/62 |
| 6,732,218 | B2 | 5/2004 | Overtoom et al. | 710/313 |
| 6,957,287 | B2 | 10/2005 | Lou et al. | 710/72 |
| 7,040,823 | B2 | 5/2006 | Silverbrook | 400/419 |
| 7,073,010 | B2 | 7/2006 | Chen et al. | 710/313 |
| 7,093,057 | B2 | 8/2006 | Choi | 710/313 |
| 7,246,189 | B2 | 7/2007 | Ulenas | 710/305 |
| 7,346,728 | B1 | 3/2008 | Jackson | 710/313 |
| 7,433,991 | B2 | 10/2008 | Fujita et al. | 710/316 |
| 7,478,191 | B2 | 1/2009 | Wurzburg et al. | 710/316 |
| 7,523,243 | B2 | 4/2009 | Bohm et al. | 710/305 |
| 7,627,708 | B2 | 12/2009 | Bohm et al. | 710/305 |
| 7,711,006 | B2 | 5/2010 | Dries et al. | 370/474 |
| 7,937,514 | B2 * | 5/2011 | Aytur | H04W 8/005 709/227 |
| 9,460,037 | B2 * | 10/2016 | Voto | G06F 13/385 |
| 9,910,806 | B2 * | 3/2018 | Margabandu | G06F 13/00 |
| 2004/0019732 | A1 | 1/2004 | Overtoom et al. | 710/313 |
| 2006/0056401 | A1 | 3/2006 | Bohm et al. | 370/360 |
| 2006/0059293 | A1 | 3/2006 | Wurzburg et al. | 710/313 |
| 2006/0227759 | A1 | 10/2006 | Bohm et al. | 370/351 |
| 2007/0245058 | A1 * | 10/2007 | Wurzburg | G06F 13/4022 710/313 |
| 2008/0005262 | A1 * | 1/2008 | Wurzburg | G06F 13/4022 709/217 |
| 2011/0029703 | A1 * | 2/2011 | Huo | G06F 13/4068 710/110 |
| 2015/0089092 | A1 | 3/2015 | Voto et al. | 710/14 |

FOREIGN PATENT DOCUMENTS

| | | | | |
|---|---|---|---|---|
| WO | 2005/018124 | A1 | 2/2005 | H04J 3/24 |
| WO | 2007/147114 | A2 | 12/2007 | G06F 13/40 |
| WO | 2015/081448 | A1 | 6/2015 | H04L 12/12 |

OTHER PUBLICATIONS

Anonymous, "On-The-Go Supplement to the USB 2.0 Specification, Rev. 1.0," 74 pages, Dec. 18, 2001.

Anonymous, "Microsoft Computer Dictionary, 5th Edition," 3 pages, 2002.

Hyde, John, "USB Design by Example: A Practical Guide to Building I/O Devices," Intel Press: Engineer to Engineer Communication, 30 pages, Apr. 2002.

Anonymous, "CY7C65640: TetraHub™ High-Speed USB Hub Controller," Cypress Semicondutor Corporation, 25 pages, Dec. 5, 2002.

Axelson, Jan, "USB Complete: Everything you Need to Develop Custom USB Peripherals, Third Edition," Lakeview Research LLC, 560 Pages, 2005.

Excerpts of Prosecution File History of Abandoned U.S. Appl. No. 10/940,406, 289 Pages, Jan. 4, 2010.

Excerpts of Prosecution File History of Abandoned U.S. Appl. No. 11/100,299, 165 Pages, Jan. 4, 2010.

Excerpts of Prosecution File History of Abandoned U.S. Appl. No. 11/424,179, 190 Pages, Jan. 4, 2010.

International Search Report and Written Opinion, Application No. PCT/US2017/047130, 11 pages, Oct. 2, 2017.

* cited by examiner

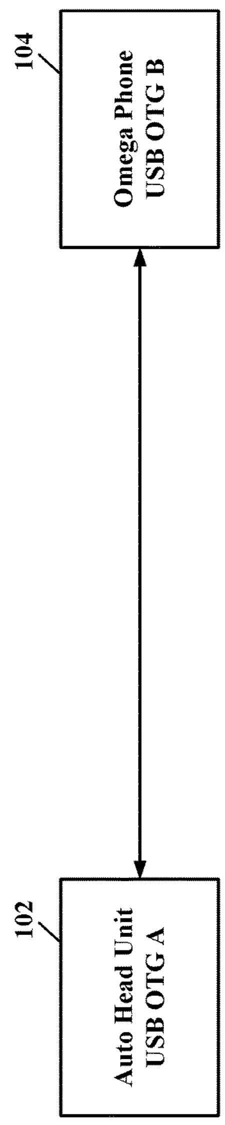
Figure 1 (Prior Technology)
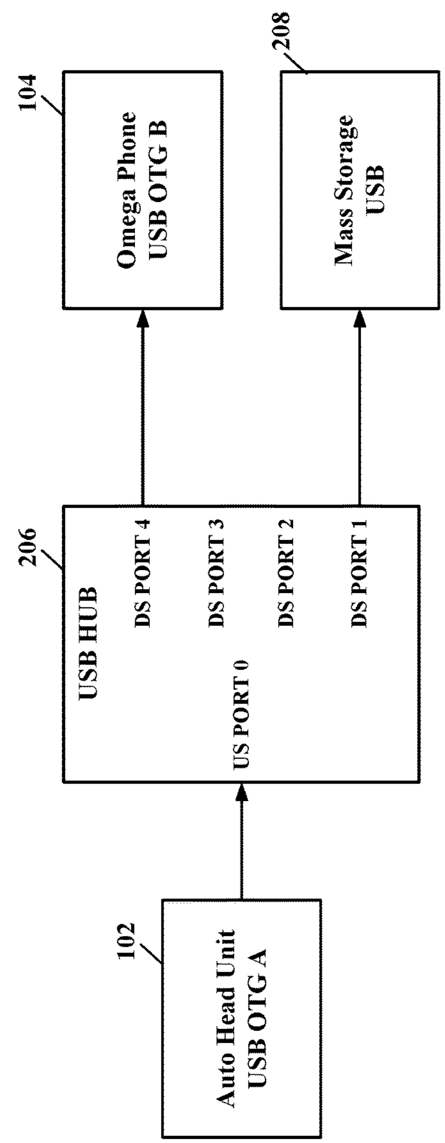
Figure 2 (Prior Technology)

USB ON THE GO (OTG) MULTI-HUB ENDPOINT REFLECTOR HUB

TECHNICAL FIELD

The present disclosure relates to interconnecting USB devices, and, more particularly, to a USB multi-host endpoint reflector hub.

BACKGROUND

USB, short for Universal Serial Bus, is an industry standard developed in the mid-1990s that defines the cables, connectors and communications protocols used in a bus for connection, communication, and power supply between computers and electronic devices. It is currently developed by the USB Implementers Forum (USB IF). USB was designed to standardize the connection of computer peripherals (including keyboards, pointing devices, digital cameras, printers, portable media players, disk drives and network adapters) to personal computers, both to communicate and to supply electric power. It has become commonplace on other devices, such as smartphones, PDAs and video game consoles. USB has effectively replaced a variety of earlier interfaces, such as parallel ports, as well as separate power chargers for portable devices.

Continual upgrades and improvements to USB have produced USB 2.0, USB 3.0, USB 3.1, USB Type-C and USB On-The-Go (OTG). Continuous upgrades and improvements are being made as new technologies and uses are found. USB is well-known and widely used with computers and other electronic devices. USB OTG is a specification first used in late 2001 that allows USB devices, such as digital audio players or mobile phones, to act as a host, allowing other USB devices, such as USB flash drives, digital cameras, mice or keyboards, to be attached to them. Use of USB OTG allows those devices to switch back and forth between the roles of host and client (slave). For instance, a mobile phone may read from removable media as the host device, but present itself as a USB Mass Storage Device when connected to a host computer.

USB OTG introduces the concept of a device performing both master and slave roles—whenever two USB devices are connected and one of them is a USB OTG host, they establish a communication link. The device controlling the link is called the master or host, while the other is called the slave or peripheral. FIG. 1 shows a USB On-The-Go (OTG) A device connected to a USB OTG B device using a point-to-point link (cable). The USB OTG A device 102 may be an automobile head unit, e.g., an integrated graphics display and audio system in the automobile, and the USB OTG B device 104 may be a smart phone that may have its information content displayed and controlled with the automobile USB OTG A device 102.

However, USB OTG is a point-to-point link, and inserting a USB hub between the USB OTG A device 102 and the USB OTG B device 104, as shown in FIG. 2, is not supported because a standard USB hub downstream port does not support the OTG role swapping. In a specific automotive mobile connectivity application, e.g., display screen mirroring, the USB device connected to one of the down-stream ports of the USB hub 206 is an OTG device 104. For screen mirroring to work, between the smart phone and automotive display, the mobile (smart phone) device 104 has to change roles and become a USB host. Since this functionality is not supported by a standard USB hub, there are two options: 1) not have a USB hub in-between the USB OTG A device and the USB OTG B device, or 2) Use flex hubs that allow the swapping of USB upstream and downstream ports. Option 2 is not useful because it does not solve the problem of having a USB host on a downstream (DS) port by swapping the DS port role to a upstream (US) port, and the prior US port (connected to the auto head unit 102) then becomes a DS port. But this causes the auto head unit 102 to lose connectivity to any other downstream USB devices. This is not acceptable in an automobile connectivity environment where multiple USB connected devices have to work together, and be displayed and/or controlled by the automobile display head unit 102.

SUMMARY

Therefore a need exists for connecting a plurality of USB devices and have them function as either an upstream (host) or downstream (slave) device, or both, and communicate with other USB devices, either upstream (host) or downstream (slave).

According to an embodiment, a method for (Universal Serial Bus) USB devices to communicate without restriction of being either a host or slave device may comprise the steps of: powering on a USB hub controller, wherein the USB hub controller routes connectivity to a first USB host connected thereto; enumerating a first USB OTG B device in device mode on a first downstream (DS) port with the first USB host; issuing a command to the first USB OTG B device to become a second USB host; inserting a endpoint reflector between the second USB host and a first internal device port of the USB hub controller; and detecting a device disconnect on the first DS port, wherein the first USB host then sees a network control model (NCM) device connected thereto; wherein the first and second USB hosts see a plurality of NCM devices, whereby non-control endpoints of the first and second USB hosts may be mirrored, thereby enabling indirect communications between the first and second USB hosts.

According to a further embodiment of the method, may comprise the step of enumerating a second USB device on a second DS port with the first USB host. According to a further embodiment of the method, the step of inserting the endpoint reflector between the second USB host and the first internal device port of the USB hub controller may comprise the step of using multiplexers to insert the bridge between the second USB host and the first internal device port of the USB hub controller.

According to another embodiment, a method for (Universal Serial Bus) USB devices to communicate without restriction of being either a host or slave device may comprise the steps of: providing a first USB upstream (US) port; providing a plurality of downstream (DS) ports; and providing an internal USB network control model (NCM) endpoint reflector coupled to a first one of the plurality DS ports; wherein the NCM endpoint reflector may be inserted upon a command from a first USB host coupled to the first USB US port.

According to a further embodiment of the method, the plurality of DS ports may be reflectored to the first US port. According to a further embodiment of the method, a plurality of USB hosts and a plurality of USB devices may be coupled to the plurality of DS ports to provide simultaneous operation thereof.

According to yet another embodiment, a (Universal Serial Bus) USB multi-host endpoint reflector hub may comprise: an upstream (US) port adapted for coupling to a USB host; hub controller logic coupled to a plurality of first downstream (DS) ports and to the US port; a multi-host endpoint bridge coupled to the hub controller logic; a first multiplexer coupled to the multi-host endpoint bridge; at least one multiplexer coupled to the first multiplexer and the hub controller logic; and at least one second downstream (DS) port adapted for coupling to at least one USB device or USB host.

According to a further embodiment, the USB host may be a USB On-The-Go (OTG) device. According to a further embodiment, the at least one USB device may be a USB OTG device. According to a further embodiment, the USB host may be a USB On-The-Go (OTG) A device and the at least one USB device may be a USB OTG B device. According to a further embodiment, the OTG device A may be an automobile display head unit. According to a further embodiment, the OTG device B may be a smart phone. According to a further embodiment, the at least one USB device may be a USB mass storage device. According to a further embodiment, the host may be an embedded host. According to a further embodiment, the at least one USB device may be a composite USB device containing multiple interfaces or endpoints of varying device classes, each being separately reflected. According to a further embodiment, the USB device may be a dual-role device. According to a further embodiment, the endpoint reflector may be programmable, adapted to emulate a plurality of USB endpoint types, and reflect each USB device class type between the hosts.

According to still another embodiment, a (Universal Serial Bus) USB multi-host endpoint reflector hub may comprise: a USB hub having a upstream (US) port and a plurality of first downstream (DS) ports; a Communication Device Class (CDC) Network Control Model (NCM) endpoint reflector Media Access Control (MAC) address switch may comprise: a plurality of USB NCM devices, and a first multiplexer coupled to the plurality of USB NCM devices; a second plurality of multiplexers coupled to the plurality of USB NCM devices and the plurality of first DS ports of the USB hub; and a plurality of second DS ports coupled to respective ones of the second plurality of multiplexers, and adapted for coupling to a plurality of USB host and slave devices.

According to a further embodiment, the USB host may be a USB On-The-Go (OTG) device. According to a further embodiment, the USB slave device may be a USB OTG device. According to a further embodiment, the USB host may be a USB On-The-Go (OTG) A device and the USB slave device may be a USB OTG B device. According to a further embodiment, the OTG device A may be an automobile display head unit. According to a further embodiment, the OTG device B may be a smart phone. According to a further embodiment, the USB slave device may be a USB mass storage device. According to a further embodiment, the host may be an embedded host. According to a further embodiment, the at least one USB device may be a composite USB device containing multiple interfaces or endpoints of varying device classes, each being separately reflected. According to a further embodiment, the USB device may be a dual-role device. According to a further embodiment, the endpoint reflector may be programmable, adapted to emulate a plurality of USB endpoint types, and reflect each USB device class type between the hosts.

According to another embodiment, a (Universal Serial Bus) USB multi-host endpoint reflector hub may comprise: a USB hub having an upstream (US) port and at least one downstream (DS) port; a first multiplexer coupled to the US port and adapted for coupling to a first USB host; a second multiplexer coupled to the at least one DS port and adapted for coupling to a second USB host or a USB dual role device, wherein a first command enables the USB hub to be switched in or out based upon a second command or the first command that changes the dual role device to its second host role; a multi-host endpoint reflector coupled between the first and second multiplexers; and control logic coupled to and controlling the first and second multiplexers, and the multi-host endpoint reflector; wherein the multi-host endpoint reflector may be adapted to reflect endpoints directly to the first host.

According to a further embodiment, connectivity between the first and second hosts may be selected from the group consisting of USB host-to-device, USB device-to-device and USB device-to-host connectivity. According to a further embodiment, the at least one DS port may revert to at least one charging port when the USB hub may be bypassed and may be no longer connected to a USB host.

BRIEF DESCRIPTION OF THE DRAWINGS

A more complete understanding of the present disclosure may be acquired by referring to the following description taken in conjunction with the accompanying drawings wherein:

FIG. 1 illustrates a schematic block diagram of a USB on-the-go (OTG) A device connected to a USB OTG B device using a point-to-point link, according to prior technology;

FIG. 2 illustrates a schematic block diagram of a USB on-the-go (OTG) A device connected to a USB OTG B device and USB mass storage using a USB hub, according to prior technology;

Figure 3:
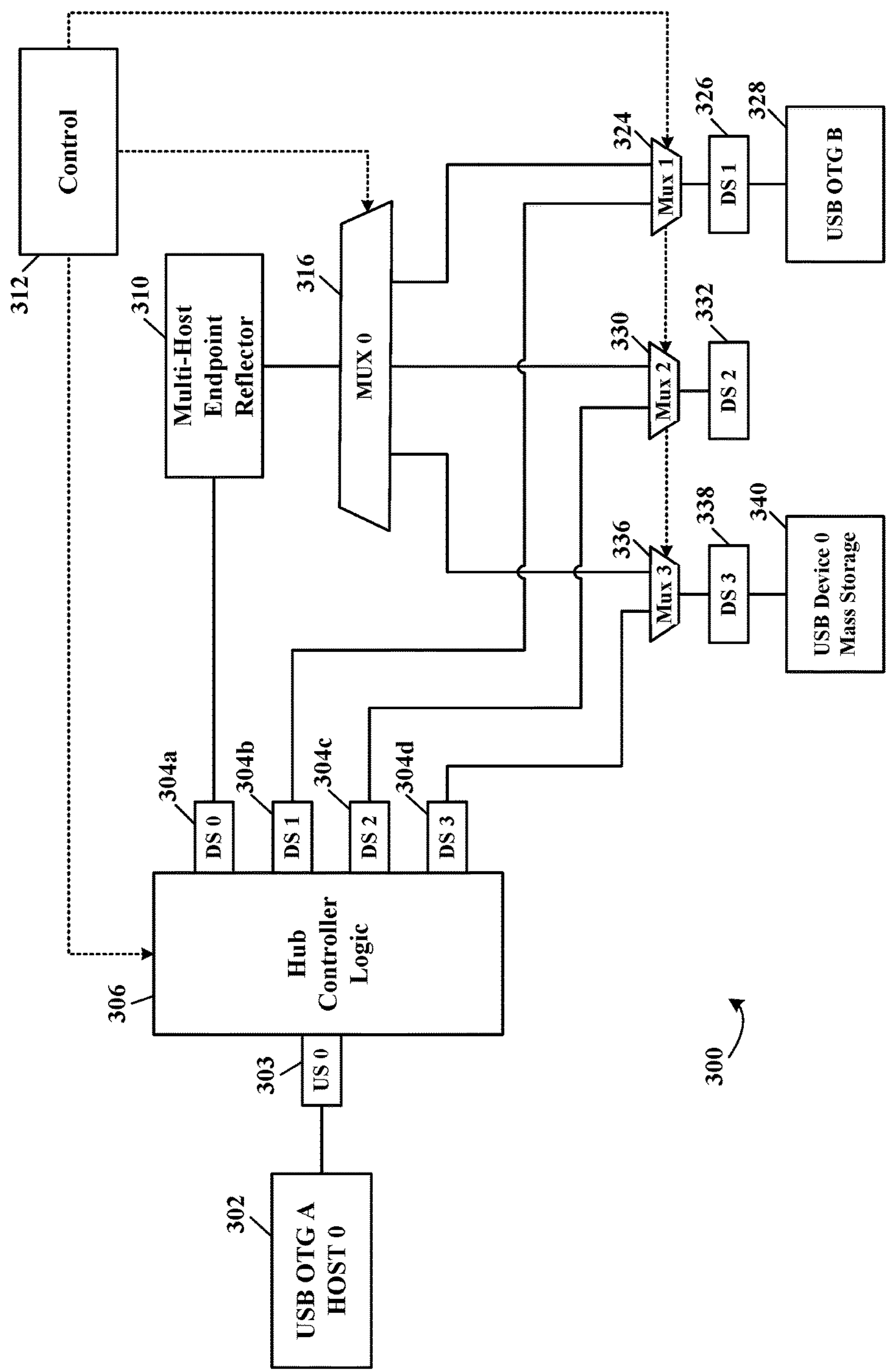
FIG. 3 illustrates a schematic block diagram of a USB multi-host endpoint reflector hub, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

According to the teachings of this disclosure, a multi-host endpoint reflector enables a method of communication between multiple USB hosts through the USB devices connected to them, where data from one USB host is routed across the USB devices between endpoints of complimentary directions to one or more additional USB hosts. The multi-host endpoint reflector may be integrated with a USB hub controller to form a USB compound device to create a multi-host endpoint reflector hub. A USB multi-host endpoint reflector hub enables a USB OTG B device to become a host upon request by providing a data bridge between the OTG B device after it has transitioned to a host role while any other OTG A device that already is a host is not required to change its host role to a slave role. Therefore a plurality of OTG host devices may co-exist on the same interconnection system hub and communicate there-between.

The USB Specification is centered on a single USB host and multiple USB devices connected to the host. This enables a host centric communication wherein the USB host issues transactions to the USB devices as scheduled by the host controller and data flow between the host and connected devices. However USB devices cannot transfer data as they wish to the host, they must wait until the host issues an appropriate transaction to the USB device.

The USB On-The-Go (OTG) Specification enabled USB devices to assume the role of a USB host as required and hence be able to take more control of the USB data flow, but the OTG model requires that the default host change to a device role simultaneously to the device changing to the host role.

According to the teachings of this disclosure, communication between multiple USB hosts through USB devices connected to them may be enabled, where data from a USB host is routed across the USB devices between endpoints in a complimentary direction. Though it is possible that these USB devices could be connected to downstream ports of a USB hub, the presence/absence of a hub does not alter the basic method of communication as more fully explained hereinafter.

Using implementation of the teachings of this disclosure, two or more USB Network Control Model (NCM) devices (e.g., NCM1 and NCM2) internally connected to two different USB hosts, e.g., Host1 & Host2, where Host1 sends data to Bulk OUT endpoint of NCM1 data interface which would be reflected to Bulk IN endpoint of NCM2, retrieved by Bulk IN transactions issued by Host2. Similarly Host2 sends data to Bulk OUT endpoint of NCM2 data interface which would be returned to Bulk IN endpoint of NCM1 data interface, retrieved by Bulk IN transactions issued by Host 1. The communication channel will look like a USB Host A<->USB Device A1<->USB Device B1<->USB Host B. Hence any data sent from USB Host A will eventually reach USB Host B through the USB devices A1 & B1. Similarly any data sent from USB Host B will eventually reach USB Host A.

Other possible implementations, according to the teachings of this disclosure, USB class devices (like USB mass storage, or USB Audio, etc.) connected to different USB hosts, where data received in any OUT endpoint of an USB device could be internally reflected on to any IN endpoint of any USB device as the design requires, thereby enabling an indirect communication channel between two USB hosts through USB devices connected to them. As explained in the above examples, the endpoint number/endpoint transfer type/interface number/alternate setting of the endpoints selected for such reflection could vary according to the USB specification and is contemplated herein.

According to various embodiments of this disclosure, when an OTG B device requests to become a host, an endpoint reflector may be inserted between the OTG B device after it has transitioned to a host role while any other OTG A device that already is a host is not required to change its host role to a slave role. Therefore a plurality of OTG host devices may co-exist on the same interconnection system hub and communicate with each either. Also non-OTG USB hosts and slaves may co-exist therewith and be able to communicate with all connected USB devices, whether host, slave, OTG or non-OTG.

Referring now to the drawings, the details of example embodiments are schematically illustrated. Like elements in the drawings will be represented by like numbers, and similar elements will be represented by like numbers with a different lower case letter suffix.

Referring to FIG. 3, depicted is a schematic block diagram of a USB multi-host endpoint reflector hub, according to a specific example embodiment of this disclosure. A USB multi-host endpoint reflector hub, generally represented by the numeral 300, may comprise hub controller logic 306 comprising an upstream (US) port 303 and a plurality of downstream (DS) ports 304, a multi-host endpoint reflector 310, a control circuit 312, a first multiplexer 316, a second multiplexer 324, a third multiplexer 330, a fourth multiplexer 336, a first DS port 326, a second DS port 332, and a third DS port 338. The US port 303 may be coupled to a USB host 302 that may or may not be an OTG device, the first DS port 326 may be coupled to a USB OTG B device 328, e.g., OTG capable smartphone; the second downstream port 332 may remain unattached, and the third DS port 338 may be coupled to a USB device 340, e.g., mass storage device. The USB devices shown in FIG. 3 are for example only, and any number and/or combination of host and/or slave USB devices may be connected to the DS ports which may be greater than or less than the number shown. The USB devices may be either OTG or non-OTG, or any combination thereof.

Operation of the USB multi-host endpoint reflector hub 300, as shown in FIG. 3, may be as follows: After powering on, the USB hub controller logic 306 routes connectivity to USB host 302 which then enumerates the USB OTG B device 328 in device mode on the first DS port 326, and also enumerates the USB device 340 (standard slave) on the third DS port 338. After completion of the USB enumeration process, the USB OTG A host 302 issues a command to the USB OTG B device 328 to change roles from a slave to a host. Thereafter, the USB OTG A host 302 issues a command to the Hub controller 306, which is handled by the control software. This control software then controls the multiplexers 324 and 316 to insert an endpoint reflector 310 between the USB OTG B device 328 and an internal device port 304*b* in the USB hub controller logic 306. After this endpoint reflector 310 is inserted, the USB host 302 sees a device disconnect on the DS port 326, and the USB host 302 will then also see a new NCM (Ethernet adapter) device at the DS 1 port 326 with endpoint reflector 310 attached. USB OTG B device 328, now in host mode, also sees an NCM (Ethernet adapter) device attached to it. After the aforementioned steps have been taken, the USB host 302 and the USB OTG B device 328, now both being USB hosts, see USB NCM devices connected to them. The non-control endpoints of these USB devices are mirrored, wherein any data from the USB host to an OUT endpoint of any of the NCM devices will be returned as response to an IN transaction on the respective paired IN endpoint of the other NCM device connected to the other host, thereby enabling indirect communications between the two host devices 302 and 328.

Figure 4:
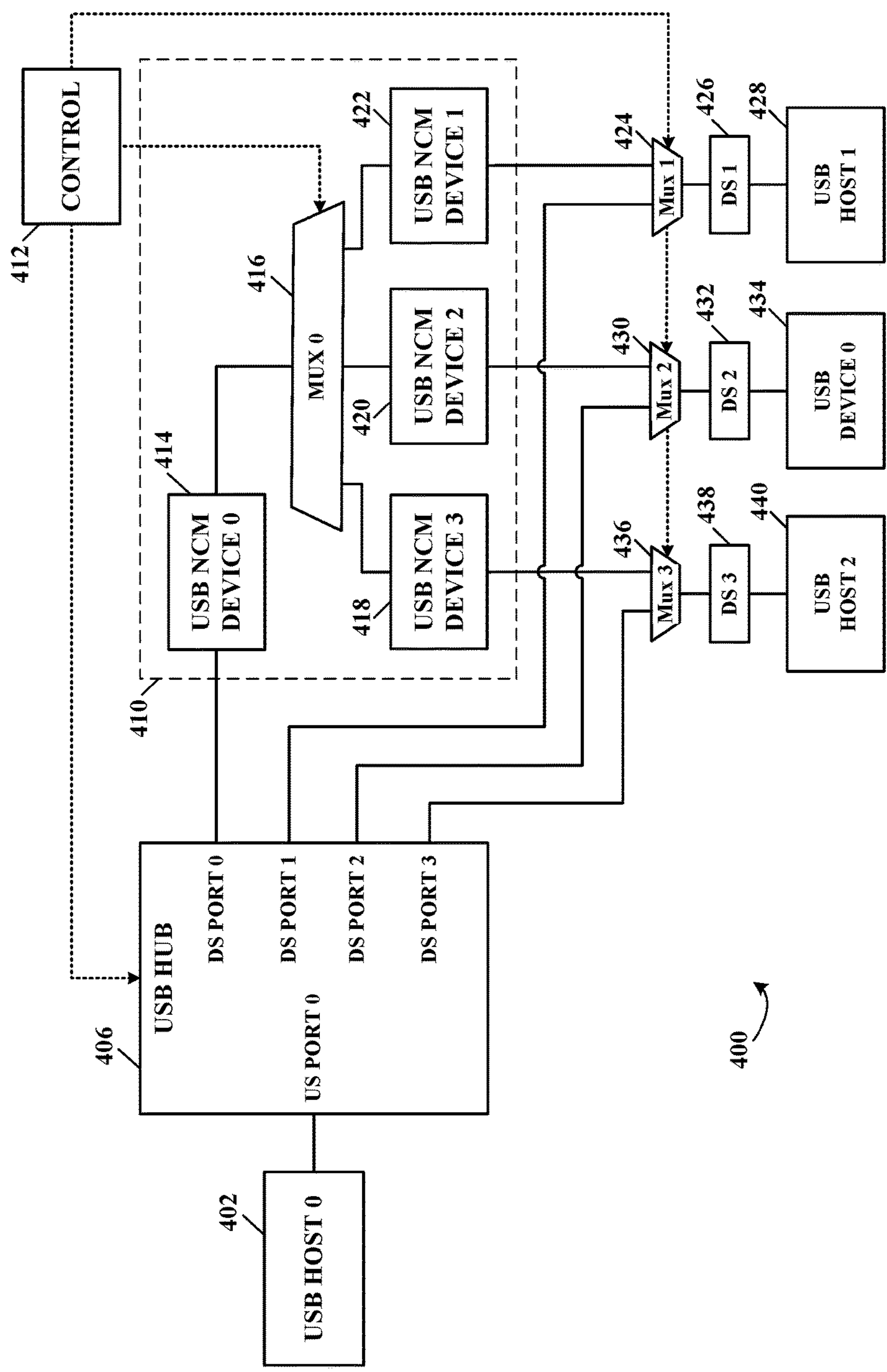
FIG. 4 illustrates a schematic block diagram of a USB multi-host endpoint reflector hub, according to another specific example embodiment of this disclosure.

Referring to FIG. 4, depicted is a schematic block diagram of a USB multi-host endpoint reflector hub, according to another specific example embodiment of this disclosure. A USB multi-host endpoint reflector hub, generally represented by the numeral 400, may comprise a USB hub 406 having an upstream (US) port and a plurality of downstream (DS) ports, a Communication Device Class (CDC) Network Control Model (NCM) bridge Media Access Control (MAC) address switch (hereinafter "NCM bridge") 410 that may comprise USB NCM devices 414, 418, 420 and 422; and a multiplexer 416. The USB NCM devices 422, 420 and 418 may be coupled to respective multiplexers 424, 430 and 436 which are also coupled to respective DS ports 426, 432 and

438. The US port of the USB hub 406 may be coupled to a USB host 402, and the DS ports of the USB hub 406 may be coupled to the respective DS ports 426, 432 and 438 through the respective multiplexers 424, 430 and 436. The DS ports 426, 432 and 438 may be coupled to respective USB devices 428, 434 and 440. These USB devices 428, 434 and 440 may be OTG or non-OTG USB devices, and may be either host or slave USB devices. Thus multiple USB host devices may communicate indirectly and thereby unknowingly with each other as well as with multiple USB slave devices.

The USB multi-host endpoint reflector hub 400 enables USB host to device, device to device and device to host connectivity between the HUB's 406 US port and any of the HUB's 406 DS ports 426, 432 and 438. USB host(s) coupled to these DS ports 426, 432 and 438 are not required to be OTG compliant, no device to host role swapping is required, although the USB hub 406 can work with a USB OTG device that requires a role swap. This concept supports simultaneous CARPLAY support on multiple downstream ports of a USB HUB. The USB multi-host endpoint reflector hub 400 enables a USB hub 406 to support an Apple phone or any smartphone operating in USB host mode to be connected on a HUB DS port. As shown in FIG. 4, the USB multi-host endpoint reflector hub 400 may implement an internal USB NCM Endpoint bridge on DS port 0 of the hub 406. An apple phone or multiple phones may be connected to the DS ports of the hub 406; the USB multi-host endpoint reflector hub 400 enables a DS bridge function on a specific DS port on an explicit command from the USB host 0 402. The USB multi-host endpoint reflector hub 400 may simultaneously bridge multiple DS ports to a single US port. The USB multi-host endpoint reflector hub 400 supports simultaneous operation of USB multiple USB hosts and devices on the DS ports. The USB multi-host endpoint reflector hub 400 eliminates the need for any custom drivers on the USB host, by implementing a USB multi-host endpoint reflector (see FIG. 3). In normal operation mode the USB multi-host endpoint reflector 310 may be connected on the hub 406 DS port 0, therefore only DS ports 1, 2 and 3 are usable ports on the multi-host controller 400 (as shown); the multi-host controller 400 inserts the NCM bridge 410 on explicit command from the Host 0 402. Thus multiple USB hosts may be connected through a USB hub 406.

Figure 5:
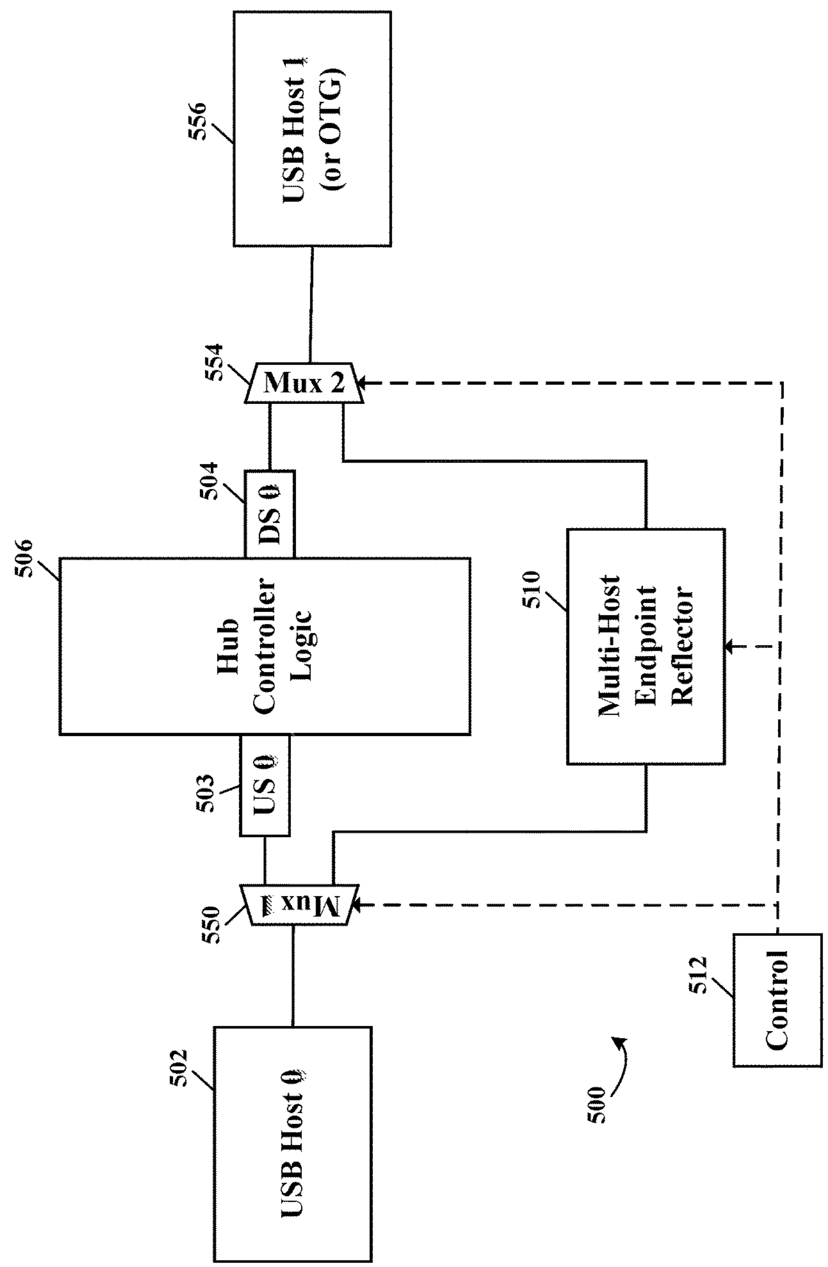
FIG. 5 illustrates a schematic block diagram of a USB multi-host endpoint reflector with hub bypass, according to yet another specific example embodiment of this disclosure.

Referring to FIG. 5, depicted is a schematic block diagram of a USB multi-host endpoint reflector with hub bypass, according to another specific example embodiment of this disclosure. A USB multi-host endpoint reflector with hub bypass, generally represented by the numeral 500, may comprise a USB hub 506 having an upstream (US) port and one downstream (DS) port, a multi-host endpoint reflector 510. The multi-host endpoint reflector 510 may be coupled to respective multiplexers 550 and 554 which are also coupled to respective upstream (US) and downstream (DS) ports 503 and 504. The US port 503 of the USB hub 506 may be coupled to a USB host 502, and the DS port of the USB hub 506 may be coupled to the respective USB device 556. The USB device 556 may be an OTG or non-OTG USB device, and may be either a host or slave USB device. Thus multiple USB host devices may communicate indirectly and thereby unknowingly with each other as well as with multiple USB slave devices.

The USB multi-host endpoint reflector with hub bypass 500 provides for functioning as a normal USB specification defined hub when USB device 556 operates as a USB device, which will be referred to herein as the default state. Upon a command from USB host 0 502, USB device 556 changes its operation to host mode, and multiplexers 550 and 554 are controlled by control logic 512 to bypass the USB hub 506 and to enable the multi-host endpoint reflector 510 which enables USB host-to-device, USB device-to-device and USB device-to-host connectivity between the USB host 502 and USB Host 556, through the multi-host endpoint reflector 510.

In another embodiment of the USB multi-host endpoint reflector with hub bypass 500, if the hub controller logic 506 has multiple DS ports enabling a plurality of USB devices. Those USB devices will function as USB specification compliant devices when hub 506 is operating in the default state. Upon a command from USB Host 0 (502), device 556 changes operation to host mode, and multiplexers 550 and 554 are switched by control logic 512 to bypass the hub 506 and to enable the multi-host endpoint reflector 510 which enables USB host-to-device, USB device-to-device and USB device-to-host connectivity between the USB host 502 and the USB host 556, through the multi-host endpoint reflector 510. When this occurs, the other DS ports of hub 506 will revert to BC1.2 Dedicated Charging Port (DCP) mode and will provide DC charging for the USB devices that are not actively communicating with either Host 0 502 or Host 1 556.

The invention claimed is:

1. A method for (Universal Serial Bus) USB devices to communicate without restriction of being either a host or slave device, said method comprising the steps of:

- powering on a USB hub controller, wherein the USB hub controller routes connectivity to a first USB host connected thereto;
- enumerating a first USB OTG B device in device mode on a first downstream (DS) port with the first USB host;
- issuing a command to the first USB OTG B device to become a second USB host;
- inserting a endpoint reflector between the second USB host and a first internal device port of the USB hub controller; and
- detecting a device disconnect on the first DS port, wherein the first USB host then sees a network control model (NCM) device connected thereto;

wherein:

- the first and second USB hosts see a plurality of NCM devices, whereby non-control endpoints of the first and second USB hosts are mirrored, thereby enabling indirect communications between the first and second USB hosts;
- the second USB host is reassigned as a USB host for the plurality of NCM devices.

2. The method according to claim 1, further comprising the step of enumerating a second USB device on a second DS port with the first USB host.

3. The method according to claim 1, wherein the step of inserting the endpoint reflector between the second USB host and the first internal device port of the USB hub controller comprises the step of using multiplexers to insert the bridge between the second USB host and the first internal device port of the USB hub controller.

4. A method for (Universal Serial Bus) USB devices to communicate without restriction of being either a host or slave device, said method comprising the steps of:

- providing a first USB upstream (US) port;
- providing a plurality of downstream (DS) ports; and
- providing an internal USB network control model (NCM) endpoint reflector coupled to a first one of the plurality DS ports;

wherein:

the NCM endpoint reflector is inserted upon a command from a first USB host coupled to the first USB US port;

the plurality of DS ports are reflected to the first US port;

a plurality of USB hosts and a plurality of USB devices are coupled to the plurality of DS ports to provide simultaneous operation thereof; and the first US port is reassigned as a USB host for the plurality of USB devices.

5. A (Universal Serial Bus) USB multi-host endpoint reflector hub, comprising:

an upstream (US) port adapted for coupling to a USB host;

hub controller logic coupled to a plurality of first downstream (DS) ports and to the US port;

a multi-host endpoint bridge coupled to the hub controller logic;

a first multiplexer coupled to the multi-host endpoint bridge;

at least one multiplexer coupled to the first multiplexer and the hub controller logic; and at least one second downstream (DS) port adapted for coupling to at least one USB device or USB host.

6. The USB multi-host endpoint reflector hub according to claim 5, wherein the USB host is a USB On-The-Go (OTG) device.

7. The USB multi-host endpoint reflector hub according to claim 5, wherein the at least one USB device is a USB OTG device.

8. The USB multi-host endpoint reflector hub according to claim 5, wherein the USB host is a USB On-The-Go (OTG) A device and the at least one USB device is a USB OTG B device.

9. The USB multi-host endpoint reflector hub according to claim 8, wherein the OTG device A is an automobile display head unit.

10. The USB multi-host endpoint reflector hub according to claim 8, wherein the OTG device B is a smart phone.

11. The USB multi-host endpoint reflector hub according to claim 5, wherein the at least one USB device is a USB mass storage device.

12. The USB multi-host endpoint reflector hub according to claim 5, wherein the host is an embedded host.

13. The USB multi-host endpoint reflector hub according to claim 5, wherein the at least one USB device is a composite USB device containing multiple interfaces or endpoints of varying device classes, each being separately reflected.

14. The USB multi-host endpoint reflector hub according to claim 5, wherein the USB device is a dual-role device.

15. The USB multi-host endpoint reflector hub according to claim 5, wherein the endpoint reflector is programmable, adapted to emulate a plurality of USB endpoint types, and reflect each USB device class type between the hosts.

16. A (Universal Serial Bus) USB multi-host endpoint reflector hub, comprising:

a USB hub having a upstream (US) port and a plurality of first downstream (DS) ports;

a Communication Device Class (CDC) Network Control Model (NCM) endpoint reflector Media Access Control (MAC) address switch comprising:

a plurality of USB NCM devices, and a first multiplexer coupled to the plurality of USB NCM devices;

a second plurality of multiplexers coupled to the plurality of USB NCM devices and the plurality of first DS ports of the USB hub; and a plurality of second DS ports coupled to respective ones of the second plurality of multiplexers, and adapted for coupling to a plurality of USB host and slave devices;

wherein a second US port is reassigned as a USB host for the plurality of USB slave devices.

17. The USB multi-host endpoint reflector hub according to claim 16, wherein the USB host is a USB On-The-Go (OTG) device.

18. The USB multi-host endpoint reflector hub according to claim 16, wherein the USB slave device is a USB OTG device.

19. The USB multi-host endpoint reflector hub according to claim 16, wherein the USB host is a USB On-The-Go (OTG) A device and the USB slave device is a USB OTG B device.

20. The USB multi-host endpoint reflector hub according to claim 19, wherein the OTG device A is an automobile display head unit.

21. The USB multi-host endpoint reflector hub according to claim 19, wherein the OTG device B is a smart phone.

22. The USB multi-host endpoint reflector hub according to claim 16, wherein the USB slave device is a USB mass storage device.

23. The USB multi-host endpoint reflector hub according to claim 16, wherein the host is an embedded host.

24. The USB multi-host endpoint reflector hub according to claim 16, wherein the at least one USB device is a composite USB device containing multiple interfaces or endpoints of varying device classes, each being separately reflected.

25. The USB multi-host endpoint reflector hub according to claim 16, wherein the USB device is a dual-role device.

26. The USB multi-host endpoint reflector according to claim 16, wherein the endpoint reflector is programmable, adapted to emulate a plurality of USB endpoint types, and reflect each USB device class type between the hosts.

27. A (Universal Serial Bus) USB multi-host endpoint reflector hub, comprising:

a USB hub having an upstream (US) port and at least one downstream (DS) port;

a first multiplexer coupled to the US port and adapted for coupling to a first USB host;

a second multiplexer coupled to the at least one DS port and adapted for coupling to a second USB host or a USB dual role device, wherein a first command enables the USB hub to be switched in or out based upon a second command or the first command that changes the dual role device to its second host role;

a multi-host endpoint reflector coupled between the first and second multiplexers; and control logic coupled to and controlling the first and second multiplexers, and the multi-host endpoint reflector;

wherein:

the multi-host endpoint reflector is adapted to reflect endpoints directly to the first host; and the second USB host is reassigned as a USB host for a plurality of second DS ports.

28. The USB multi-host endpoint reflector hub according to claim 27, wherein connectivity between the first and second hosts is selected from the group consisting of USB host-to-device, USB device-to-device and USB device-to-host connectivity.

29. The USB multi-host endpoint reflector hub according to claim 27, wherein the at least one DS port reverts to at least one charging port when the USB hub is bypassed and is no longer connected to a USB host.

* * * * *